C. O. GREENE.
Cooking Stove.
No. 27,216.
2 Sheets—Sheet 1
Patented Feb. 21, 1860.
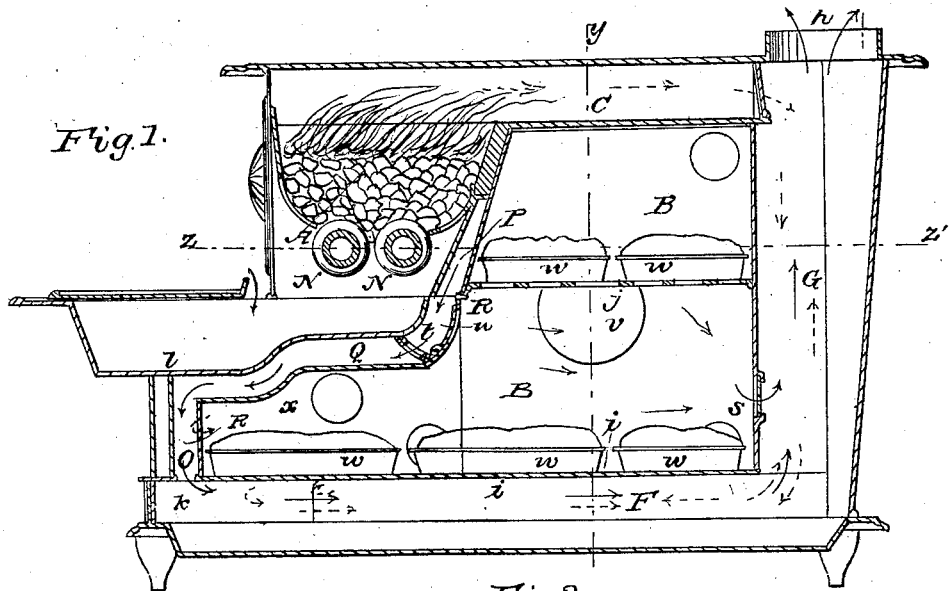
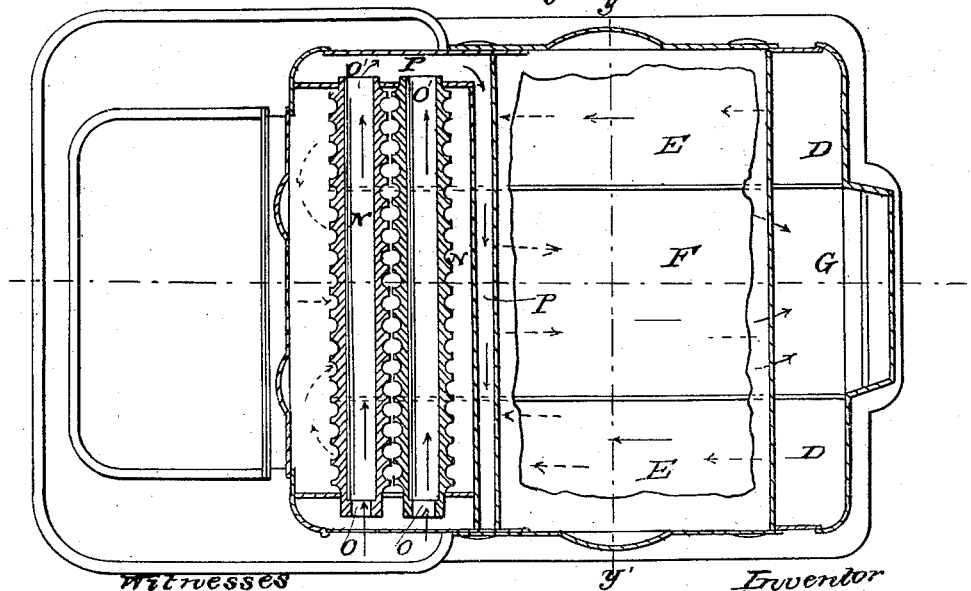

C. O. GREENE.
Cooking Stove.

No. 27,216.

2 Sheets—Sheet 2.

Patented Feb. 21, 1860.

WITNESSES
F. A. Sheldon
A. H. Park

INVENTOR
Chauncey O. Greene

UNITED STATES PATENT OFFICE.

CHAUNCEY O. GREENE, OF TROY, NEW YORK.

COOKING-STOVE.

Specification of Letters Patent No. 27,216, dated February 21, 1860.

*To all whom it may concern:*

Be it known that I, CHAUNCEY O. GREENE, of the city of Troy, in the county of Rensselaer and State of New York, have invented a new and useful improvement in such cooking-stoves as have an oblong fire-box for burning coal or other solid fuel and an oven which has some part or parts insufficiently heated by the fire-box and smoke-flues; and I do hereby declare that the following contains a full and exact description of my invention, reference being had to the annexed drawings, which make a part of this specification, and in which—

Figure 4:
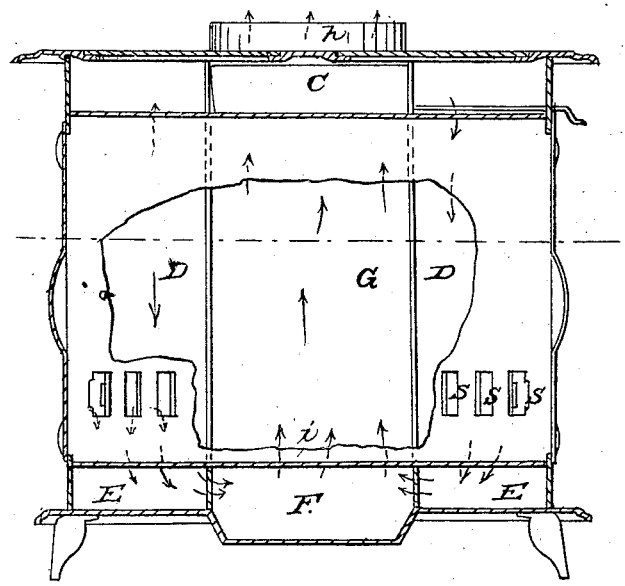
Figure 3:
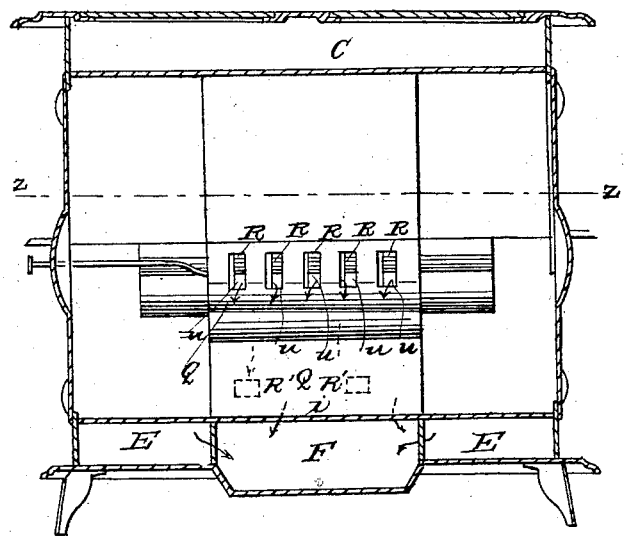

Figure 1 is a vertical section from front to rear through the middle of a cooking stove constructed with my improvement; Fig. 2 a horizontal section of the same at, and plan of some parts below the line $z\ z'$; and Figs. 3 and 4 vertical transverse sections of the same at, and elevations of some parts in front and in rear of the line $y\ y'$.

The same letters refer to like parts in all the figures.

My improvement consists in the arrangement of one, two, or more hollow, cylindrical, transversely-grooved, cast-iron or metallic bar or bars, longitudinally within so as to serve as a grate for the oblong fire-box, each tubular grate-bar being provided with journals at its ends and so mounted that it can be revolved on its axis when in use, and also having at one end communication with the open air, and at the other end communication with the smoke or gas-flues of the stove by means of an air-passage or air-passages, or apertures leading along the outside of or through the part or parts of the oven which is or are not sufficiently heated by the smoke-flues and fire-box; so that by reason of the strong draft of the hot gases of combustion in the smoke-flues, cold air is drawn into and through and highly heated within the said tubular bar or bars, and carried from there through the said air-passages so as to add heat to the otherwise deficiently heated part or parts of the oven, and then discharged into the smoke-flues, of the stove. I thus construct the stove in order that the air shall be heated hotter while passing through the hollow grate-bars, and therefore give out more caloric to, and thus promote the baking capability of the oven in a higher degree, than if the air-heating grate-tubes were merely plain hollow bars instead of being so grooved transversely as to present a greater amount of heating surface to the ignited fuel and allow the air from under the grate to follow up in the grooves and make the combustion more rapid on the top side of the bars $i$ and than if the grate-tubes were arranged transversely across instead of longitudinally within the oblong fire-box; and also in order that larger quantities of heated air shall be drawn from the air-heating grate-tubes and carried through or along in contact with, so as to add more heat to the part or parts of the oven deficiently heated by the smoke-flues and the fire-box, than if the air was not thus sucked through the grate-tubes and air-passages directly into the smoke-flues by reason of the strong draft of the gases of combustion in the latter, and also in order that by simply turning the hollow grate-bars on their axes they may be and are kept free from ashes so as to thereby insure the requisite heating of the air which passes through them to the oven, and from becoming warped and burned out too soon, as has been the fate of the plain, air-heating tubes heretofore fixed as grates in cooking stoves.

Inasmuch as the many cooking stoves to which my improvement is applicable may and do have the oven of various forms, and the oblong fire-box and the smoke-flues variously arranged in respect to each other and to the oven, the parts that are deficiently heated by the smoke-flues and fire-box will consequently be in different places in the oven in the variously constructed stoves; and the position and arrangement of the air-passages or apertures through which the heated air passes from the longitudinally-arranged grate-tubes in the oblong fire-box along or through the deficiently heated part or parts of the oven will of course require to be varied accordingly. But as it is impracticable to describe all or many such modifications which may be adopted and the stove still retain the essential features of my invention, I will, by way of elucidation, describe the application of my improvement in constructing a cooking-stove which has the oven, B, (see the annexed drawings,) arranged back of and extended both lower than and underneath the oblong fire-box, A; and the smoke-flues so arranged that the hot gases of combustion will pass from the fire-box, first through a flue, C, along the top of the oven; then down through flues, D, D, along the back of the oven, then under the oven to its front end (*x*) through flues, E, E, and back to its rear end through a flue, F, and finally up along the back side of the oven through a flue, G, to the exit or draft-pipe at *h*, as illustrated by the red arrows in the drawings. Consequently, in such a stove, the front part, *x*, of that portion of the oven which extends under the hearth, *l*, is deficiently heated by the fire-box and smoke-flues, as is also the oven-space at *v* under the slide *j*, whenever that slide and the oven-bottom, *i*, are both covered by bake-pans, *w*.

N, N, are the two hollow, cylindrical transversely-grooved cast-iron bars open at both ends and arranged lengthwise, within so as to serve as a grate to the bottom of the oblong fire-box, A. Each hollow bar, N, (see Figs. 1 and 2,) is provided with journals at its ends which are fitted within round apertures in the end-plates of the fire-box so that each bar can be revolved and rocked back and forth and turned over on its axis in the fire-box when in use, by means of any suitable key temporarily inserted in the end, *o*, of the grate-bar, through an aperture opposite thereto in the outside-plate of the stove. The ends *o*, *o*, of the grate-bars communicate directly with the open air or the air of the room in which the stove is placed, (see Fig. 2,); and the other ends, *o'*, *o'*, of the grate-bars communicate with the smoke-flues of the stove, at *k*, by means of the air-passages, P, Q, which lead along in contact with the top and the front end of the deficiently heated lower front part, *x*, of the oven; so that by reason of the strong draft through the smoke-flues, a large quantity of air is drawn into the grate-tubes N, N, where it is highly heated, and from there through the air-passages P Q so as to add heat to the deficiently-heated part *x* of the oven, and then into the smoke-flues at *k* where it mingles with the gases of combustion and adds heat to the front portion of the bottom-plate, *i*, of the oven.

R, R, are apertures from the flue-space P into the oven-space, *v*, just under the slide *j*; and S, S, are apertures from the oven-space under the slide into the smoke-flue G. Two registers, one, *t*, in the air-passage Q, and the other, *u*, in the apertures R, are so arranged that by means of them the air-passage Q may be closed and the apertures R opened, so that the heated air will, by reason of the draft through the flue G, be drawn through the air-heating grate-tubes N, N, air-passage P, apertures R, the oven-space, and the apertures S, into the smoke-flue G; so that thereby heat will be added to the oven-space under the slide; which part of the oven is not sufficiently heated by the fire-box and smoke-flues whenever the slide and the oven-bottom are both covered with bake-pans.

It is obvious that while the form of the oven and the position and arrangement of the smoke-flues and fire-box in respect to the oven remain the same, the arrangement of the air-passages which lead from the grate-tubes along, or into and then out of, or through the part or parts of the oven which are not sufficiently heated by the fire-box and smoke-flues may be varied and the stove still retain the essential features of my improvement. For instance, the apertures at R may be closed, and the air-passage Q closed at the smoke-flue-space *k*, and an aperture made at R', Fig. 1, so that the heated air will be drawn from the grate-tubes N, N, through the passages P Q, aperture at R', the oven space from front to rear, and the apertures S, into the smoke-flue G.

I do not herein broadly claim the use of a hollow, cylindrical, transversely-grooved bar, or two or more such bars, open at both ends, for a fire-grate in a cooking stove; nor do I claim the use of plain, stationary, air-heating grate-tubes having communication both with the open air and the oven, as heretofore constructed and arranged in cooking-stoves. Neither do I claim in cooking stoves an air-heating chamber placed back of the fire-box and having communication with the outer air, and with the smoke-flues by means of air-passages leading through, or along in contact with the outside of, a part or portions of the oven insufficiently heated by the fire-box and smoke-flues.

What I claim as my improvement in cooking-stoves and desire to secure by Letters Patent is—

The hollow, cylindrical, transversely-grooved grate-bar or grate-bars, N, when arranged lengthwise of and so as to be capable of revolution within the oblong fire-box, A, and having communication at one end with the open air, and at the other end communication with the smoke-flues of the stove by means of an air-passage or air-passages arranged in contact with the outside of or leading through the part or parts of the oven not sufficiently heated by the fire-box and smoke-flues, substantially as and for the purposes herein set forth.

CHAUNCEY O. GREENE.

Witnesses:
F. A. SHELDON,
A. F. PARK.